United States Patent [19]

Butcher

[11] Patent Number: 4,814,029

[45] Date of Patent: Mar. 21, 1989

[54] PROCESS FOR MAKING CERAMIC BODIES WITH OPEN CHANNELS

[75] Inventor: Kenneth R. Butcher, Kent, Ohio

[73] Assignee: Norton Company, Worcester, Mass.

[21] Appl. No.: 117,716

[22] Filed: Nov. 6, 1987

[51] Int. Cl.[4] .......................... B29C 47/06; B32B 18/00

[52] U.S. Cl. .......................................... 156/89; 156/155; 156/244.11; 156/244.13; 156/244.24; 264/59

[58] Field of Search ...................... 156/89, 155, 244.11, 156/244.13, 244.15, 244.24; 264/59; 428/116

[56] References Cited

U.S. PATENT DOCUMENTS

| | | | |
|---|---|---|---|
| 2,499,977 | 3/1950 | Scott | 156/155 |
| 2,506,244 | 5/1950 | Stopka | 264/59 |
| 3,437,723 | 4/1969 | Habermann | 264/59 |
| 3,737,367 | 6/1973 | Roberts et al. | 156/155 |
| 3,790,654 | 2/1974 | Bagley | 264/177 |
| 3,825,460 | 7/1974 | Yoshikawa et al. | 156/296 |
| 3,923,940 | 12/1975 | Hujii et al. | 264/59 |
| 4,026,746 | 5/1977 | Strau | 156/155 |
| 4,065,046 | 12/1977 | Roberts et al. | 156/155 |
| 4,453,962 | 6/1984 | Harada et al. | 156/155 |

*Primary Examiner*—Caleb Weston
*Attorney, Agent, or Firm*—Walter Fred

[57] ABSTRACT

Processes for making rigid ceramic bodies with one or more channels therein includes forming an outer tube of extrudable ceramic mix about an inner core of extrudable organic mix within the chamber of a piston type extrusion barrel composite, simultaneously extruding the outer tube and inner core through a tapered extrusion die having an extrusion outlet of smaller cross sectional size and area than the inner chamber of the extrusion barrel, cutting the extruded single core composite strand into shorter composite strands of equal length, filling the extrusion barrel with a plurality of the single core composite strands, simultaneously extruding the plurality of composite strands through the extrusion die and thereby forming a multiple core composite strand, cutting the multiple core composite strand into unfired green composite ceramic bodies and firing or alternatively prior to the cutting and firing steps again cutting the multiple core composite strand into equal lengths, refilling of the barrel therewith and extruding of a plurality of the multiple core composite strands through the extrusion die one or more times necessary to produce a ceramic body with the desired number of channels and then firing to simultaneously burn out the organic cores and cure the ceramic body.

27 Claims, 1 Drawing Sheet

PROCESS FOR MAKING CERAMIC BODIES WITH OPEN CHANNELS

TECHNICAL DISCLOSURE

A monolithic ceramic body with multiple open channels is produced by filling the barrel of a piston extender with preformed composite strands of predetermined cross sectional shape each comprised of ceramic material surrounding an inner core of organic material of desired cross sectional shape, simultaneously extruding the plurality of composite strands through a die of less cross sectional area than the barrel and heating the ceramic body sufficiently to burn out the organic cores and form the channels and fire the ceramic.

BACKGROUND OF THE INVENTION

1. Field of Invention

The invention relates to a process and product produced by the process of making monolithic ceramic bodies such as honeycomb structures and catalyst supports having a plurality of open channels.

2. Description of the Prior Art

Heretofore, monolithic ceramic honeycomb and catalyst support bodies have been produced in various ways. One known method is to extrude the material to its desired final shape in one step, then dry and fire the body.

Another process assembles a plurality of ceramic coated rods or tubes of burnable or removable material together and sinter them into a single unit.

Still another process assembles and sinters together relatively thin corrugated and flat sheets of ceramic material.

These prior art extrusion processes require very complex and expensive extrusion or pressing dies and require extreme care in handling before drying and firing thereof.

On the other hand the other processes are more time consuming and less economical because they require more careful handling of and precise assembly of very thin fragile preformed sheets of elongated tubular elements.

Also, the channeled products produced by the prior art processes are on a practical commercial scale limited to about 200 cells or channels per square inch of cross sectional area.

The process disclosed hereinbelow can produce a more coherent and less fragile product with at least one but preferably a greater number of cells or channels per cross sectional area.

SUMMARY OF THE INVENTION

A monolithic ceramic body with one or more channels e.g. a honeycomb is produced by first preparing suitable outer extrudable plastic ceramic mix comprised of ceramic materials and additions of organic extrusion aids and water and a second suitable inner extrudable plastic organic mix of organic filler material, organic extrusion aids and water. A tube of the ceramic mix is formed within and fills the outer portion and a predetermined length of the barrel of a piston type extruder and the organic mix is placed inside the outer ceramic tube and forms the inner core of an extrudable composite plastic filling the entire cross sectional area of the barrel.

The entire composite plastic mass is then extruded through a die of relatively smaller cross sectional area than the barrel and produces a single extruded composite strand of smaller cross sectional area and shape than the original composite mass. At this point the single composite strand may be cut to the desired length and fired to burn out the organic mix and produce bodies with a single channel. Preferably, to form ceramic bodies with multiple channels the single composite strand is cut into equal lengths and the barrel of the extruder is then filled with preextruded and aligned composite strands of equal length less than the length of the barrel chamber.

The repacked multiple single composite strands of equal length are then simultaneously extruded through a die of smaller cross sectional area than the barrel and produces a single extruded composite strand of smaller cross sectional area containing a number of organic cores equal to the total number of cores of the preextruded strands loaded into the barrel.

To further increase the number of cores the single strand with multiple cores can be cut to length and the barrel repacked therewith and simultaneously extruded as before whereupon the extruded strand will contain a greater number of cores equal to the number of cores in each strand times the number of composite strands loaded into the barrel. These cutting, repacking and extruding steps may be repeated until the desired number of cores are obtained.

The extruded composite strand with the desired number or cores therein is then cut to the desired length dried and fired in any suitable well known manner whereby the organic material is burned out and produces a rigid ceramic body with a plurality of channels.

DESCRIPTION OF THE PREFERRED EMBODIMENT(S)

Figure 1:
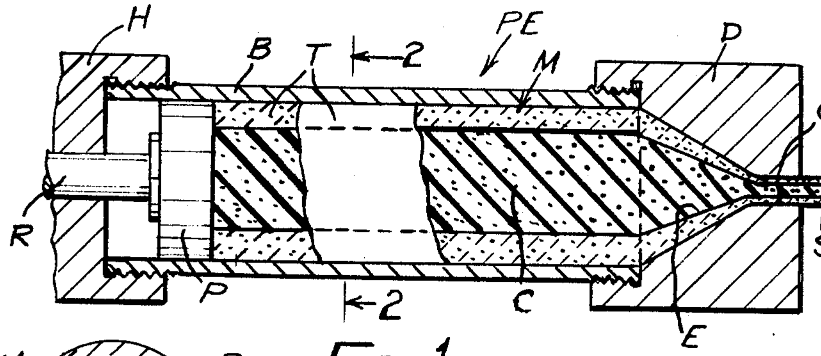
FIG. 1 is a sectional view of a portion of a piston type extruder and the extrusion barrel thereof initially loaded with a composite mass of extrudable material comprised of an inner core of organic material surrounded by and situated within an outer tube of ceramic material.

Referring to FIG. 1 there is shown a portion of a conventional piston type extrusion apparatus PE comprising a support head H usually supported by a frame or base not shown and in which is slideably mounted a piston rod R attached to a piston P moveable therewith relative to the support head H. The head H also supports a removeable extrusion barrel or cylinder C threaded into the head and in the chamber of which the piston is forcefully reciprocated between opposite ends of the extrusion barrel or cylinder C by the usual mechanical or hydraulic means not shown. To the opposite or outlet end of the extrusion barrel C is threadedly or removably attached, in a suitable manner, an extrusion die D with a gradually converging tapered or cone shaped entrance portion E converging to a preferably polygonal shaped outlet end portion O of relatively smaller cross sectional area than the inner chamber of the barrel B. Obviously the barrel and die may be of various sizes and shapes, other than disclosed herein by example.

A typical piston extrusion cylinder or barrel C which may be from 6" to 18" (15.2 to 45.7 cm) in length has an internal diameter of about 4½" (11.4 cm) and the polygonal shape outlet portion O of the die has an internal cross sectional size and area less than the internal cross sectional area of the barrel B.

In one example described herein below the hexagonal or square polygonal shape outlet of the extrusion die has an internal diameter or width between the opposing walls of about 0.72" (18.3 mm).

Figure 2:
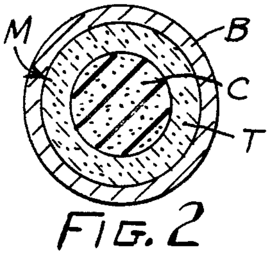
FIG. 2 is a cross sectional view of the extrusion barrel taken on line 2—2 of FIG. 1.

As shown in FIG. 2 the interior of the extrusion barrel or cylinder B is substantially initially filled both axially and diametrically with a composite cylindrical mass or slug M of extrudable material comprising an outer tube of ceramic material T surrounding an inner core C of organic material.

The composite cylindrical mass or slug M of extrudable material may be preformed in various ways outside of and then inserted into the barrel B. One method of forming the composite slug M is to remove the barrel B and stand it upright with its outlet end supported on a flat surface. A core forming rod or tube of predetermined round or polygonal cross sectional shape size and of relatively shorter length than that of the barrel so as to allow room for the entrance of the piston is centered in the barrel B.

An extrudable ceramic mix T is then packed in between the barrel and the core forming rod or tube a predetermined axial depth. The core forming rod which may be precoated with or made of an antistick type material such as nylon or PTFE (Polytetrafluoroethylene) is then removed and the interior of the tube of ceramic mix T is then packed and completely filled with the organic core material C.

After the initial composite mass or slug M is formed or placed within the barrel the unfilled inlet end portion of the barrel is inserted over the piston P and attached to the head H. Then the extrusion die is attached to the outlet end of the extrusion cylinder or barrel B. The composite slug or mass M is then extruded by forcefully advancing the rod and piston toward the extrusion die D whereupon the piston P simultaneously contacts and forces both the entrapped outer tube of ceramic mix T and inner core or organic mix through the converging entrance E and outlet O of the extrusion die D.

During extrusion, the composite mass or slug M can only move in the direction of the die which simultaneously reduces in direct portion the initial shape, size and area of both the outer ceramic tube T and organic core C to form a proportionately relatively smaller continuous single composite strand S of the composition mass M.

Like the initially larger preformed mass or slug M the continuous strand S extruded therefrom also has a single smaller core of organic material C surrounded by a thinner layer or tubular wall of the ceramic material T.

Although the outlet portion O of the die D and hence the composite strand S produced thereby is as shown, preferably of hexagonal cross sectional shape, it could be of any other polygonal shape or circular shape which allows a plurality individual strand cut from the continuous strand S to be closely repacked in the extrusion cylinder or barrel B without leaving voids or relatively large voids between the individual strands.

Figure 3:
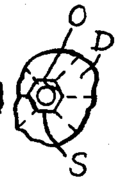
FIG. 3 is a partial end view of the polygonal shaped outlet in the extrusion die of FIG. 1.

In FIG. 3 the individual composite strand S of hexagonal cross sectional shape extruded through the device of FIG. 1 is shown to have an inner circular organic core C within an outer ceramic tube T with hexagonally shaped peripheral surfaces. However, the core could have a polygonal shape similar to but preferably the same as that of the outer tubular ceramic material T. This could be produced by initially forming the outer tube of the ceramic mix T around a hexagonal shaped core forming rod and forming the tapered surface E of die D so they extend and taper inwardly from a large polygonal shaped entrance to a smaller outlet end portion of the same polygonal shape. Hence, the resulting extruded single core composite strand S would have both a polygonal shape core within a ceramic tube in which the thickness of the tube wall is of substantialy uniform thickness.

As the composite mass or slug M is being extruded the single core continuous composite strand S is cut, in any suitable manner, into individual pieces of substantially identical length less than that of the extrusion barrel minus the length taken up by the piston P.

Alternatively, at this point the single core composite strand can be cut into pieces of any desired length and then fired as taught hereinbelow to burn out the core and produce a rigid ceramic body with but one open channel or aperture therein.

Figure 4:
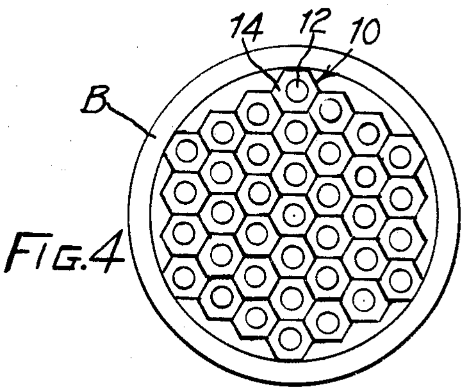
FIG. 4 is a cross sectional view of an extrusion barrel loaded with a plurality of smaller single composite strand preformed and cut either from the composite mass shown in and extruded by the device of FIG. 1 or preformed in any other well known and suitable manner.

In a typical example of producing a multiple channel ceramic body the extruded or preformed single core composite strand S is cut into shorter individual composite strands 10 about 11" (27.9 cm) long each having a single core 12 of the organic mix C surrounded by a tubular wall of 14 ceramic material T and repacked into the extrusion barrel cylinder or barrel B as shown in FIG. 4. The individual strands 10 are closely packed together with their ends substantially aligned with one another and the flat or straight sides thereof engaged by the sides of the adjacent strands 10 whereby no voids are present between the individual strands 10 in the entire packed bundle thereof inserted into the barrel B as shown in FIG. 4.

As can be seen in FIG. 4 the packed elongated bundle of individual single core composite strands 10 of relatively small cross sectional area contains a predetermined number thereof to fill, as much as possible, the entire cross sectional area of the extrusion barrel B. When packed together the bundle of individual composite strands 10 of hexagonal or square polygonal shape will produce a bundle thereof of larger hexagonal peripheral shape which can be inscribed within an extrusion barrel having an internal bore or chaber of either like hexagonal or circular cross sectional size and shape. In either case there will be a certain number of voids of relatively small and insignificant cross sectional area present between the outer periphery of the bundle and the inner surface and bore of the extrusion barrel B. The extrusion barrel tightly packed with the bundle of closely packed individual composite strands 10 and containing as shown by example only in FIG. 4 about 37 composite strands 10 with an equal number of cores 12 is again attached to the head H as before. The die D is reattached to the outlet end of the extrusion barrel and the piston is forced into engagement with the aligned ends of the individual composite strands 10 in the bundle whereupon each of the composite strands 10 are simultaneously advanced toward and into the die D.

During axial movement of the bundle of the individual single core strands 10 the inwardly convergent tapered or inclinded surfaces E of the die D exerts a equal force toward the axis of the bundle which is transmitted to each of the sides of each of the composite strands 10 in the bundle. Hence, each of strands 10 is equally and proportionally reduced in cross sectional area and combined into a continuous single integral multiple core strand 20 containing a homogenously combined mass of the ceramic material T of hexagonal cross sectional shape containing and surrounding a plurality of organic cores 22 extending longitudinally and spaced from one another by the intervening ceramic material.

The multi-core composite strand 20 being extruded through the same die D will have the same cross sectional size and shape as the single core strands S and 10 with the exception that it now contains a number of elongated cores 22 of proportionately smaller cross sectional area and size each surrounded by a thinner layer or wall 24 of the ceramic material T.

At this stage in the process the multiple core strand 20 can be cut into individual pieces or strands of any desired length, supported and dried if necessary. Then the shorter multiple core strands 20 are fired in a kiln at a temperature required to simultaneously burn out the organic cores 22 and produce a fired monolithic honeycomb ceramic body containing a plurality of spaced elongated channels or passages extending longitudinally through the ceramic body.

Alternatively, the die D could be replaced with a larger die whereby the composite multiple core strand 20 and the honeycomb ceramic body produced thereby would be of larger cross sectional size and area but containing the same number of larger cores and channels and ceramic walls of greater thickness.

Figure 5:
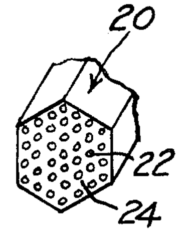
FIG. 5 is an enlarged end view of a portion of a composite strand extruded and or produced by simultaneous extrusion of the multiple composite strands of FIG. 4 through the same extrusion die of either the same or larger cross sectional area shown in FIG. 1 and 3.
Figure 6:
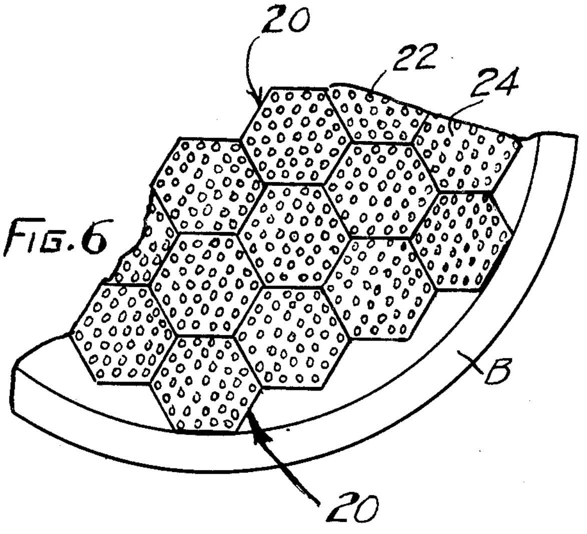
FIG. 6 is an enlarged cross sectional view of a portion of the same extrusion barrel reloaded with a plurality of the smaller single strands of FIG. 5 with multiple cores produced and cut from the composite mass shown in FIG. 4.
Figure 7:
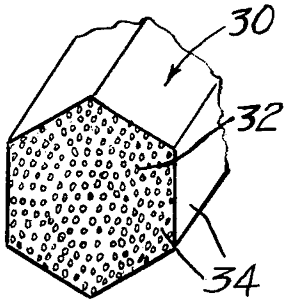
FIG. 7 is an end view of a portion of a monolithic fired ceramic body with the multiple cores burned out and forming a like number of channels therein produced and cut from the extruded composite mass of FIG. 6.

To produce a composite strand ceramic body 30 with a still greater number of smaller cores or channels 32 and surrounding thinner ceramic wall 34 as shown in FIG. 7 the extruded multiple core strand 20 shown in FIG. 5 can be cut into individual strands of equal length and the same number of strands 20 packed together as shown in FIG. 6 into another bundle as was done previously and packed into the same extrusion barrel B and then extruded together through the same die D or another die with an outlet of larger size and cross sectional area than the die D shown.

The extrudable ceramic mix may contain any of the well known ceramic or refractory oxides, carbides, and nitrides such as alumina, zirconia, silicon, silicon carbide, silicon nitride and mixtures thereof of suitable particle size mixed with a small percentage of clay starch, grease organic burn out material and water.

A typical example of the ingredients used in formulation of the ceramic mix is shown in the following table I.

TABLE I

FORMULATION OF CERAMIC MIX

| Ingredients | % by Weight |
|---|---|
| Calcined Alumina particles (8 micron) | 63% |
| Clay (Kaolin) | 3% |
| Organic Burnout (polypropylene) | 10% |
| Starch (Corn) | 3% |
| Cup Grease | 1% |
| Water | 20% |

Likewise the extrudable organic mix for producing the inner cores and hence the channels may contain any of the well known burnable organic paper, wood and plastic materials of suitable particle size mixed with a small percentage of a suitable surfactant methyl cellulose, a water soluble polymer and water.

One example of the ingredients used in formulation of the extrudable organic mix is disclosed in the following table II.

TABLE II

FORMULATION OF ORGANIC MIX

| Ingredients | % by Weight |
|---|---|
| Surfactant (Calgon) | 2% |
| Methyl Cellulose (methocel) | 8% |
| Water Soluble Polymer (UCAR) | 4% |
| 60 micron Polypropylene Powder (Hercoflat) | 50% |
| Water | 36% |

UCAR - Tradename of Union Carbide
Hercoflat - Tradename of Hercules Chemical

One example of making a multiple channel ceramic body from the above mix is disclosed in the following example.

EXAMPLE I

Each of the mixes shown in Tables I and II were mixed to an extrudable consistency in a high intensity mixer. They were loaded into the barrel of a piston extruder creating the pattern similar to FIG. 1. This was accomplished by placing a length of pipe 3" (7.6 cm) outside diameter in the center of the empty barrel and packing the ceramic mix around it. The pipe was then drawn out and the resulting inner cavity filled with the organic mix.

The barrel was then placed on the extruder and the barrel contents extruded through a hexagonal die. The inside diameter of the extrusion barrel was 4½ (11.4 cm) inches. The wall-to-wall diameter of the hexagonal die was 0.72 inches (18.3 mm).

The extrudate column was cut into lengths about 11 (27.9 cm) inches long and packed into an identical extrusion barrel. In all, 26 pieces were placed into the barrel filling it. The air gaps or voids caused by the slight imperfect filling of the barrel caused some roughness of the extrudate but this does not seem to be a major problem in producing an acceptable product.

This barrel load was extruded through the same die creating a single composite multi-core strand or column with 26 cores or channels of organic mix contained in the ceramic matrix.

This single multiple core extruded strand or column was cut into 11 inch lengths and again loaded into an extrusion barrel. When this barrel load was extruded a single strand or column with approximately 676 cores or channels was created.

This last extrusion column was cut into lengths of 1 and 2 inches (2.5 and 5 cm). They were air dried overnight, and then oven dried at 110° C. for several hours.

The pieces were fired to 2650° F. (1455° C.) with a five hour soak. The resulting hexagonal ceramic pieces had a wall to wall diameter of 0.680 inches ( 17.5 mm). This calculates to about 1600 channels/in$^2$ of cross section.

It can readily be seen that the basic concept and process disclosed hereinabove can be manipulated to give a wide range of products with one or more channels of various size and shapes.

The percentage of open cross sectional area can be altered by changing the relative amounts of ceramic and organic mix put into the initial barrel loading.

The size and number of the open channels can be manipulated by the relative diameters of the die and the extrusion barrel and also by the number of times the extrudate is recycled.

The concept could also be used to make a two phase composite material by replacing the organic mix with another ceramic mix.

As many variations and embodiments of invention are possible it is to be understood that the embodiments disclosed hereinabove are merely presented as an example thereof and that the invention includes all modifictions and embodiments thereof falling within the scope of the appended claims.

I claim:

1. A method of making a ceramic body with open channels extending therethrough comprising the steps of:

preparing a batch of an extrudable ceramic mix and a batch of an extrudable organic mix;

forming the ceramic and organic mixes into a plurality of single core composite strands of relatively small cross sectional area and of substantially the same length so each composite strand comprises an inner core of the organic mix surrounded by an outer layer of the ceramic mix;

closely aligning and packing together a number of the single core composite strands into an inner chamber of an extrusion barrel of a conventional extruder sufficient to substantially fill the inner chamber of relatively larger cross sectional area and size than each of the single core composite strands;

simultaneously extruding and forming the plurality of single core composite strands packed in the inner chamber into a multiple core composite strand of smaller cross sectional size and area than the inner chamber and having a plurality of spaced cores of the organic mix surrounded by and spaced from one another by the ceramic mix by forcing the single core composite strands through an extrusion die having an inner inclined surface extending and tapering inwardly from a large inlet end portion to an outlet end portion of the extrusion die and an extrusion aperture of predetermined cross sectional shape and of smaller cross sectional size and area than the inner chamber of the extrusion barrel;

cutting the multiple core composite strand into one or more unfired green multiple core composite bodies of desired length; and firing the unfired green multiple core composite bodies at sufficient temperature and period of time to burn out the plurality of organic cores and bond the ceramic mix into a rigid ceramic body with a plurality of spaced open channels extending therethrough.

2. A method according to claim 1 further comprising, prior to cutting the multiple core composite strand into infired green multiple core composite bodies, performing one or more times necessary to produce a desired greater number of cores and channels the additional steps of:

cutting the extruded single multiple core composite strand into a number of multiple core composite strands of substantially equal length;

closely aligning and packing together a number of multiple core composite strands into the inner chamber of an extrusion barrel sufficient to substantially fill the inner chamber of relatively larger cross sectional area and size than each of the multiple core composite strands; and simultaneously extruding and forming the plurality of multiple core composite strands in the inner chamber into another multiple core composite strand of smaller cross sectional size and area than the inner chamber and having a greater number of spaced cores of the organic mix surrounded by and spaced from one another by the ceramic mix than the first multiple core composite strand extruded from the single core composite strands, by forcing the multiple core composite strands through an extrusion die having an inner inclined surface extending and tapering from a large inlet end portion to an outlet end portion of the extrusion die and an extrusion aperture of predetermined smaller cross sectional size and area than the inner chamber of the extrusion barrel.

3. A method according to claim 1 wherein the plurality of single core composite strands are extruded through an extrusion die aperture of polygonal cross sectional shape whereby the multiple core composite strand and multiple channel ceramic body produced therefrom have the same polygonal cross sectional shape.

4. A method according to claim 1 wherein the single core composite strands are formed to have both an inner organic core and an outer tube of ceramic mix each of circular cross sectional shape.

5. A method according to claim 4 wherein the extrusion step comprises:

simultaneously extruding the plurality of single core composite strands each with an inner organic core and an outer ceramic tube of circular cross sectional shape through an extrusion die aperture of circular cross sectional shape whereby the multiple core composite strand and the multiple channel ceramic body produced therefrom, including the cores and channels, all have a circular cross sectional shape.

6. A method according to claim 4 wherein the extrusion step comprises:

similtaneously extruding the plurality of single core composite strands each with an inner core and outer ceramic tube of circular cross sectional shape through an extrusion die aperture of polygonal cross sectional shape whereby the multiple core composite strand and the multiple channel ceramic body produced therefrom have an outer polygonal cross sectional shape and the cores and channels are of circular cross sectional shape.

7. A method according to claim 1 wherein each of the single core composite strands are formed to have an inner organic core of circular cross sectional shape surrounded by an outer tube of the ceramic mix of polygonal cross sectional shape.

8. A method according to claim 7 wherein the extrusion step comprises:

simultaneously extruding a plurality of single core composite strands each with an inner organic core of circular cross sectional shape surrounded by an outer tube of the ceramic mix of polygonal cross sectional shape through an extrusion die aperature of circular cross sectional shape whereby the multiple core composite strand and the multiple channel ceramic body produced therefrom and the cores and channels all have a circular cross sectional shape.

9. A method according to claim 7 wherein the extrusion step comprises:

simultaneously extruding a plurality of single core composite strands each with an inner organic core of circular cross sectional shape surrounded by an outer tube of ceramic mix of polygonal cross sectional shape through an extrusion die aperature of polygonal cross sectional shape whereby the multiple core composite strand and multiple channel ceramic body produced therefrom are of polygonal cross sectional shape and the cores and channels are of circular cross sectional shape.

10. A method according to claim 1 wherein the step of forming the ceramic mix and organic mix into each of the plurality of single core composite strands comprises:

forming both the outer ceramic tube and the inner organic core to have a polygonal cross sectional shape.

11. A method according to claim 10 wherein the extrusion step comprises:

simultaneously extruding the plurality of single core composite strands each with an inner core and an outer ceramic tube of polygonal shape through an extrusion die aperture of polygonal cross sectional shape whereby the multiple core composite strand and multiple channel ceramic body produced therefrom are of polygonal cross sectional shape with cores and channels of polygonal cross sectional shape.

12. A method according to claim 10 wherein the extrusion step comprises:

simultaneously extruding the plurality of single core composite strands each with an inner core and an outer ceramic tube of polygonal shape through an extrusion die aperature of circular cross sectional shape whereby the multiple core composite strand and multiple channel ceramic body produced therefrom are of circular cross sectional shape and the cores and channels are of polygonal cross sectional shape.

13. A method of making a ceramic body with an open channel comprising the steps of:

preparing a batch of an extrudable ceramic mix and a batch of an extrudable organic mix;

forming within an inner chamber of predetermined cross sectional size and shape in an extrusion barrel of a piston type extruder, an outer ceramic tube of the extrudable ceramic mix with an internal bore of predetermined cross sectional size and shape;

filling and packing the central bore of the ceramic tube with the etrudable organic mix to form an extrudable composite body comprising an inner core of the extrudable organic mix surrounded by the outer tube of extrudable ceramic mix;

simultaneously extruding the outer tube of ceramic mix and inner core of organic mix through an extrusion die having an inner inclined surface extending and tapering inwardly from an inlet end portion to an outlet end portion of the extrusion die including an outlet aperture of predetermined cross sectional shape and of smaller cross sectional size and area than the inner chamber of the extrusion barrel and thereby producing a continuous single core composite strand of the relatively smaller cross sectional size and area of the aperture;

cutting the single core composite strand into unfired green single core composite bodies of desired length; and firing each of the unfired green single core composite bodies at sufficient temperature and period of time to burn out the organic core and bond the ceramic mix into a rigid ceramic body with an open channel therethrough.

14. A method according to claim 13 wherein the forming step comprises:

forming the outer tube of ceramic mix so it has an outer circular cross sectional shape and an internal bore and core of organic mix therein of circular cross sectional shape.

15. A method according to claim 14 wherein the extruding step comprises:

simultaneously extruding the outer tube of ceramic mix and the core of organic mix each of circular cross sectional shape through an extrusion die aperture of circular cross sectional shape whereby the single core composite strand and the channeled ceramic body produced therefrom and the core and channel are all of circular cross sectional shape.

16. A method according to claim 14 wherein the extruding step comprises:

simultaneously extruding the outer tube of ceramic mix and core of organic mix each of circular cross sectional shape through an extrusion die aperture of polygonal cross sectional shape whereby the single core composite strand and ceramic body produced are of polygonal cross sectional shape and the core and channel are of circular cross sectional shape.

17. A method according to claim 13 wherein the forming step comprises:

forming the outer tube of ceramic mix so it has an outer circular cross sectional shape and an internal bore and a core of organic mix therein of polygonal cross sectional shape.

18. A method according to claim 17 wherein the extrusion step comprises:

simultaneously extruding the outer tube of ceramic mix of circular cross sectional shape and the core of organic mix of polygonal cross sectional shape through an extrusion die aperture of polygonal cross sectional shape whereby the single core composite strand and channeled ceramic body produced therefrom and the core and channel are all of polygonal cross sectional shape.

19. A method according to claim 17 wherein the extruding step comprises:

simultaneously extruding the outer tube of ceramic mix of circular cross sectional shape and the core of organic mix of polygonal cross sectional shape through an extrusion die aperture of circular cross sectional shape whereby the single core composite strand and channeled ceramic body produced therefrom are of circular cross sectional shape and the core and channel are of polygonal cross sectional shape.

20. A method according to claim 2 wherein the single core composite strands and multiple core composite strands are extruded through an extrusion die aperture of polygonal cross sectional shape whereby the multiple core composite strand and ceramic body produced therefrom have the same polygonal cross sectional shape.

21. A method according to claim 2 wherein the single core composite strands and the multiple core composite strands are formed to have inner organic cores of circular cross sectional shape surrounded by the extrudable ceramic mix and are extruded through an extrusion die aperture of circular cross sectional shape whereby the multiple core composite strand and the multiple channel ceramic body produced therefrom have the same circular cross sectional shape and cores and channels of circular cross sectional shape.

22. A method according to claim 2 wherein the single core composite strands and the multiple core composite strands are formed to have inner organic cores of circular cross sectional shape surrounded by the ceramic mix formed to a polygonal cross sectional shape and are extruded through an extrusion die aperture of polygonal cross sectional shape whereby the multiple core composite strand and multiple channel ceramic body produced therefrom have the same polygonal cross sectional shape including cores and channels of circular cross sectional shape.

23. A method according to claim 2 wherein the single and multiple core composite strands and the inner organic cores are of polygonal cross sectional shape and are extruded through an extrusion die aperture of circular cross sectional shape whereby the multiple core composite strand and multiple channel ceramic body produced therefrom have the same circular cross sectional shape and cores and channels of polygonal cross sectional shape.

24. A method according to claim 2 wherein the single and multiple core composite strands and the inner organic core therein are of polygonal cross sectional shape and are extruded through an extrusion die aperture of polygonal cross sectional shape whereby the composite multiple core strand and multiple channel ceramic body produced therefrom and core and channels therein are of polygonal cross sectional shape.

25. A method of making a composite ceramic body with cores extending therethrough comprising the steps of:

preparing a batch of an extrudable first ceramic mix and a batch of an extrudable second mix of a different composition;

forming the first ceramic and second mixes into a plurality of single core composite strands of relatively small cross sectional area and of substantially the same length so each composite strand comprises an inner core of the second mix surrounded by an outer layer of the first ceramic mix;

closely aligning and packing together a number of the single core composite strands into an inner chamber of an extrusion barrel of a conventional extruder sufficient to substantially fill the inner chamber of relatively larger cross sectional area and size than each of the single core composite strands;

simultaneously extruding and forming the plurality of single core composite strands packed in the inner chamber into a multiple core composite strand of smaller cross sectional size and area than the inner chamber and having a plurality of spaced cores of the second mix surrounded by and spaced from one another by the first ceramic mix by forcing the single core composite strands through an extrusion die having an inner inclined surface extending and tapering inwardly from a large inlet end portion to an outlet end portion of the extrusion die and an extrusion aperture of predetermined cross sectional shape and of smaller cross sectional size and area than the inner chamber of the extrusion barrel;

cutting the multiple core composite strand into one or more unfired green multiple core composite bodies of desired length; and firing the unfired green multiple core composite bodies at sufficient temperature and period of time to bond the first ceramic mix and cores of the second mix together into a rigid composite ceramic body with a plurality of spaced cores of the second mix extending therethrough.

26. A method according to claim 25 further comprising, prior to cutting the multiple core composite strand into unfired green multiple core composite bodies, performing one or more times necessary to produce a desired greater number of cores of the second mix the additional steps of;

cutting the extruded single multiple core composite strand into a number of multiple core composite strands of substantially equal length;

closely aligning and packing together a number of multiple core composite strands into the inner chamber of an extrusion barrel sufficient to substantially fill the inner chamber of relatively larger cross sectional area and size than each of the multiple core composite strands; and simultaneously extruding and forming the plurality of multiple core composite strands in the inner chamber into another multiple core composite strand of smaller cross sectional size and area than the inner chamber and having a greater number of spaced cores of the second mix surrounded by and spaced from one another by the first ceramic mix than the first multiple core composite strand extruded from the single core composite strands, by forcing the multiple core composite strands through an extrusion die having an inner inclined surface extending and tapering from a large inlet end portion to an outlet end portion of the extrusion die and an extrusion aperture of predetermined smaller cross sectional size and area than the inner chamber of the extrusion barrel.

27. A method of making a composite ceramic body with a core of different composition therein comprising the steps of:

preparing a batch of an extrudable first ceramic mix and a batch of an extrudable second mix of a different composition;

forming within an inner chamber of predetermined cross sectional size and shape in an extrusion barrel of a piston typ extruder, an outer ceramic tube of the extrudable first ceramic mix with an internal bore of predetermined cross sectional size and shape;

filling and packing the central bore of the ceramic tube with the extrudable second mix to form an extrudable composite body comprising an inner core of the extrudable second mix surrounded by the outer tube of extrudable first ceramic mix;

simultaneously extruding the outer tube of the first ceramic mix and inner core of the second mix through an extrusion die having an inner inclined surface extending and tapering inwardly from an inlet end portion to an outlet end portion of the extrusion die including an outlet aperture of predetermined cross sectional shape and of smaller cross sectional size and area than the inner chamber of the extrusion barrel and thereby producing a continuous single core composite strand of the relatively smaller cross sectional size and area of the aperture;

cutting the single core composite strand into unfired green single core composite bodies of desired length; and firing each of the unfired green single core composite bodies at sufficient temperature and period of time to bond the first ceramic mix and core of the second mix into a rigid composite ceramic body with a core of the second mix therein.

* * * * *